United States Patent

Oguey

[11] 3,845,335
[45] Oct. 29, 1974

[54] ELECTROMAGNETIC STEPPING MICROMOTOR

[75] Inventor: Henri J. Oguey, Peseux, Switzerland

[73] Assignee: Centre Electronique Horloger S.A., Neuchatel, Switzerland

[22] Filed: Aug. 6, 1973

[21] Appl. No.: 385,717

[30] Foreign Application Priority Data
Aug. 30, 1972 Switzerland.................. 12794/72

[52] U.S. Cl.................. 310/49, 310/156, 310/257
[51] Int. Cl. ...................................... H02k 37/00
[58] Field of Search ........ 310/257, 268, 43, 49, 156

[56] References Cited
UNITED STATES PATENTS

| | | | |
|---|---|---|---|
| 3,181,020 | 4/1965 | Welter | 310/268 X |
| 3,423,617 | 1/1969 | Kohlhagen | 310/49 |
| 3,594,622 | 7/1971 | Inagaki | 310/257 X |
| 3,614,495 | 10/1971 | Suzuki | 310/268 X |
| 3,678,311 | 7/1972 | Mattingly | 310/156 |

*Primary Examiner*—D. F. Duggan
*Attorney, Agent, or Firm*—Stevens, Davis, Miller & Mosher

[57] ABSTRACT

An electromagnetic stepping micromotor includes a rotor formed by a flat disc of high-coercivity ferromagnetic material having $n$ radially projecting angularly separated teeth all magnetized in a like axial direction. A stator includes two coplanar parts of soft ferromagnetic material, an inner part having $n$ outwardly projecting teeth and an outer part having $n$ inwardly projecting teeth, imbricated in one another and separated by a relatively narrow air-gap having $2n$ radially extending portions. The rotor is mounted between said coplanar parts of the stator and a cover having $2n$ selectively disposed apertures providing variations in reluctance defining $2n$ angularly stable positions of the rotor. The stator also includes a core with a second cover completing the magnetic circuit between the coplanar parts, and a coil supplied with bipolar clock pulses for driving the rotor.

7 Claims, 6 Drawing Figures

ELECTROMAGNETIC STEPPING MICROMOTOR

The invention concerns electromagnetic stepping motors, and more particularly rotary electromagnetic stepping micromotors for timekeepers, comprising a rotor in the form of at least one disc having magnetized parts and a stator of soft ferromagnetic material having two coplanar parts imbricated in one another and separated by a sinuous air-gap.

The most precise electronic wrist-watches are those including a quartz crystal oscillator. Electronic means divide the high frequency of the quartz crystal to produce low frequency pulses supplying a time-display. Apart from several prototypes including a digital electronic display, the majority of quartz watches presently manufactured display the time by means of hands driven by a micromotor.

Small caliber watches require a very small motor with a very low mean power consumption compatible with a miniature electric cell which must have a life of at least one year. These requirements risk leading to a motor producing such a small torque that it is of uncertain operation and may be incapable of driving a calendar mechanism. To avoid this, it is therefore necessary to provide a miniature motor with a high efficiency, capable of providing a torque comparable with that of larger motors, while having a lesser energy consumption. It must also be able to reliably operate in the normal conditions met when wearing a watch, i.e., it must be resistant to shocks, to differences in temperature, to magnetic fields, etc. Cost considerations dictate that the motor must be simple in principle, have a relatively low number of parts, especially moving parts, have large manufacturing tolerances, employ low-cost materials, and must be adapted for mass production without a need for specal adjustment operations.

Micromotors can be classified into three different types:

The first type employ the resonance of a vibrator or a diapason to mechanically drive a wheel by means of a pawl and ratchet device. This type requires an adjustment of the natural frequency, and the pawl and ratched device is delicate to manufacture. The cost price is also high, and these motors are relatively bulky.

The second type employs an oscillating part coupled with an escapement mechanism. Such systems involve very severe manufacturing tolerances, but they do not enable the volume, the energy consumption and the price to reach values as low as could be desired.

The third type of these motors are constituted by "rotary" stepping motors, i.e., motors in which a magnetized rotor disc is driven electromagnetically from supplied clock pulses. Several very interesting models are already available industrially. However, the adaptation of these motors to very small calibers encounters certain obstacles which are difficult to conciliate with the above-indicated list of requirements.

An object of the invention is to provide a motor of this latter type, which is compatible with very small caliber watches, e.g., ladies watches, and which is of low cost.

The motor according to the invention is characterized in that the rotor is flat and includes at least one wheel having n teeth, the teeth being axially magnetized in the same direction, the air-gap of the stator being narrow in relation to the width of the teeth of the rotor and having substantially the same shape as the periphery of the rotor.

The motor according to the invention has small overall dimensions (e.g., 6 × 6 × 4 mm), draws a mean current less than 4 $\mu A$ at 1.35 V, and has a high efficiency. It is extremely simple and involves only a single mobile piece. The various parts are cheap and can be mass produced with relatively large manufacturing tolerances and no adjustment is necessary. Moreover, the motor can be made in the form of a module or closed unit which leaves the watch manufacturer great freedom for elaboration of the caliber, and is advantageous for assembly of the watch and for after-sales servicing. The motor is also compatible with the normal conditions encountered during wear of watches, i.e., it can withstand variations in temperature, shocks, etc. It is also silent.

The accompanying drawings show, by way of example, an embodiment of a micromotor according to the invention as well as a varied form of a rotor. In the drawings.

Figure 1:
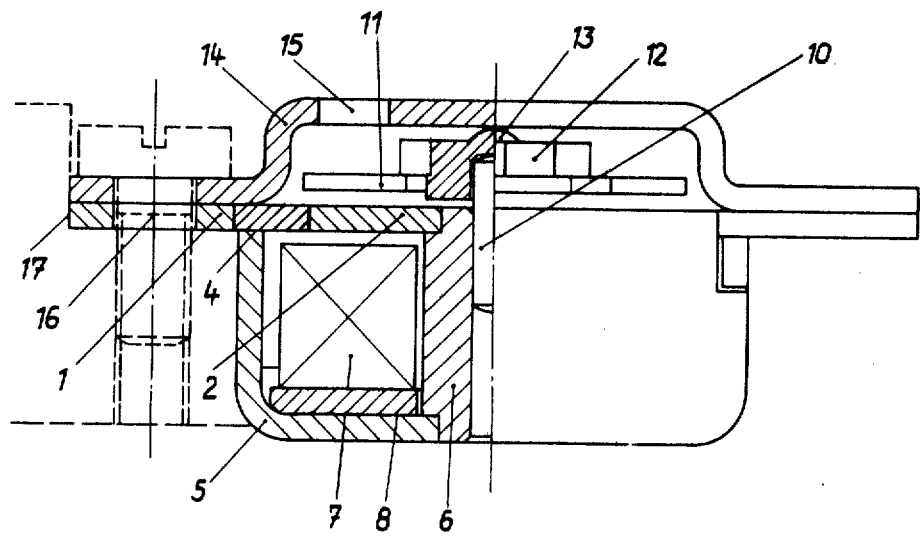
FIG. 1 is a side elevational view, partly in cross-section, of the motor.

The motor shown in FIGS. 1 to 4 comprises a stator formed by two parts in a soft ferromagnetic material, for example an iron-nickel alloy, forming a magnetic circuit, namely a first, outer part 1 and a second, inner part 2. The part 2 has six tooth-forming radial projections which fit in six corresponding apertures of slightly larger dimensions in the part 1, with a sinuous air-gap 3 separating the two parts. The upper surfaces of the parts 1 and 2 are coplanar and the parts are joined together by non-magnetic securing elements 4. The magnetic circuit between the parts 1 and 2 is closed by a cover 5 and a core 6, both of soft ferromagnetic material. A coil 7 of fine wire is disposed about the core 6, within the cover 5. This coil 7 is supported on cover 5 by an insulating board 8. The board 8 protrudes laterally from one side of cover 5 (FIG. 1), and on its protruding part are fixed connexion terminals 9 of the motor. A pin 10 is tightly fitted in a bore in the upper end of core 6, and serves as a pivot for a rotor composed of a thin disc 11 with six radially projecting teeth fitted on a plastic — material pinion 12 having a rounded central upper bulge 13. The disc 11 is composed of a high coercivity ferromagnetic material, such as a Platinum-Cobalt or a Samarium-Cobalt alloy, and is homogeneously magnetized in the axial direction. The stator is completed by a cover 14, also of ferromagnetic material, covering the rotor and having, in relation to (i.e., above) the rotor, local variations of reluctance provided in the example shown by arranging a plurality (twelve) of openings 15 equi-spaced from one another in circular configuration. The outer part 1 and cover 14 also include protruding opposite portions 17 of arcuate contour in which fixing holes 16 are provided.

The motor operates as follows:

When a current is passed through the energization coil 7, a difference of magnetic potential is set up between the parts 1 and 2 of the magnetic circuit, which produces a magnetic field across the air-gap 3. The induced magnetic field in turn exerts forces on the teeth of the rotor, producing a rotational torque. If the rotor turns from a position in which the torque is maximum to a position spaced by about a quarter of the pitch of the teeth of the rotor, the torque drops to zero and further movement would lead to a reverse torque. If, however, at this precise instant, the current in coil 7 is cut, the rotor can continue to turn by a further quarter of a pitch under the combined effect of its kinetic energy (inertia) and a torque of magnetostatic origin. This magnetostatic torque is essential for any rotary stepping motor. It is periodic as a function of the angular position of the rotor and determines the stable positions thereof and its ability for withstanding, in the absence of energization current, antagonistic torques due to the load and to shocks. The planar form of the face of the stator opposite to the rotor, and the narrow radial air gaps, lead to a low power consumption of the micromotor, as the periodic magnetostatic torque produced by the stator is very small, even if the rotor is highly magnetized. It is thus possible to employ independent means for adjusting the amplitude and phase of this torque. These means are here materialized by the regularly spaced openings 15 in cover 14 which produce a periodic variation of the reluctance in the region of the stator opposed to parts 1 and 2.

The high magnetization of the rotor leads to a high electromagnetic coupling and a high efficiency. Adjustment of the magneto-static torque independent of the coupling process enables a choice of the phase of the torque which leads to the best operating conditions, in particular to a preferred direction of rotation, and to a choice of the amplitude of the torque adapted to the particular load conditions.

A constant axial force also acts on the rotor in the direction of parts 1 and 2 of the stator. This force is greater than the weight of the rotor, so that a single stop is sufficient to limit its axial movement, whatever be its position. This is the function of the pin 10. It is possible to reduce and adjust the axial force by reducing the distance between the rotor and cover 14. In the event of a violent shock, the bulge 13 acts as a stop member limiting the axial path of the rotor.

The following characteristics and numerical values are given, by way of example, for a specific embodiment of motor:

Rotor: diameter 4.4 mm; thickness 0.2 mm; disc made of PtCo; mass of disc, 15 mg.
Stator: sheets of 50 percent Ferronickel, thickness 0.3 mm.
Coil: enamelled copper wire $\phi$ 20 microns ($\mu$m); 4,300 turns; resistance 2,500 Ohm.
Control pulses: bipolar; frequency 1 Hz; voltage $\pm$ 1.2 V; duration 10 ms.
Mean current consumption: 4 $\mu$A.
Number of steps per rotation: 12.
Maximum magnetostatic torque: 1 $\mu$ Nm; maximum driving torque 1.3 $\mu$ Nm.
Bulk of the motor body: height 4 mm; length/width 6 $\times$ 6 mm.

This motor has dimensions and a consumption compatible with a 20 mm round watch caliber fed by a 50 mAh battery. If the electronics consumes 1 $\mu$ A, the total consumption of 5 $\mu$ A corresponds to a cell duration in excess of 1 year. Moreover its cost price is low for the following reasons: cheap materials, apart from the Pt-Co of which there is only a very small quantity. The various parts are easy to fabricate. The stator can be made by stamping or chemical working and bending. The rotor can be stamped, and magnetized very simply in a homogeneous magnetic field. The latter point is to be emphasized, since difficulties would be involved in the manufacture of a onepiece multipolar rotor with alternating magnetization, having the quoted dimensions and with this material having a very high coercive field. To the contrary, the described toothed rotor which has homogeneously magnetized poles alternating with empty zones behaves like an alternating pole rotor, while being easy to magnetize. The coil is inexpensive since it has a simple shape and includes a wire of sufficient diameter to avoid any problems in winding. The manufacturing tolerances are not critical. Slight irregularities in the dimensions or magnetization of the teeth of the rotor or stator have a very slight effect because, for each step, the electromechanical coupling takes place over all of the teeth of the stator and rotor. To minimize the magnetostatic torque provided by the stator, it is important for parts 1 and 2 to be coplanar. This condition is automatically fulfilled by the following manufacturing process. Holes are stamped in a plate at the locations corresponding to the securing elements 4; these holes are then filled with an epoxy resin forming the elements 4; the air gap 3 separating the plate into parts 1 and 2 is then provided by chemical etching, the parts 1 and 2 being held together by the epoxy resin. The tolerances between the axes of the motor pinion and the wheel driven thereby (in general, a seconds wheel) are easily achieved since the motor is positioned by placing the arcuate portions 17 in a circular recess of a main plate concentric with the pinion. The part 1 of the stator thus both acts magnetically, and for positioning the motor.

Assembly of the motor is simple. The coil 7 is maufactured by warm winding, then stuck onto the support 8. After soldering the wires onto terminals 9, the support 8 is stuck on cover 5 in which core 6 and pin 10 have been previously fitted. The peripheral edge of cover 5 fits against part 1 of the stator, with core 6 engaging in a central bore of part 2. As soon as the rotor is fitted on pin 10, it is held in place by magneto-static forces. Cover 14 can be fitted when the motor is being mounted in a watch, after placing the seconds wheel. The cover 15 and the main body of the motor are fixed together by screws, passing through holes 16, which also serve to secure the motor in a watch.

Figure 3:
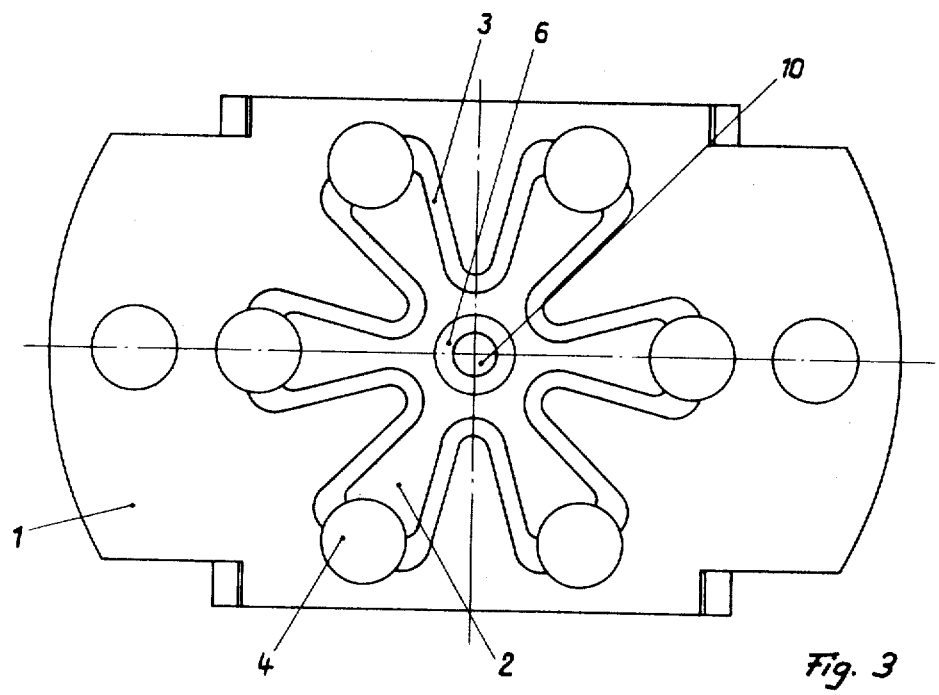
FIG. 3 is a plan view of the stator.

FIG. 3 shows the principal plane of the stator, before mounting the rotor. In this figure, it can be clearly seen that the toothed outer part 1 and inner part 2 of the stator are separated by an air-gap 3 having 12 radially directed angularly equidistant segments.

The end core 6, and pin 10 which serves as shaft for the rotor, can be seen in a central bore of part 2. Parts 1 and 2 are mechanically connected together by the non-magnetic parts or securing elements 4.

Figure 2:
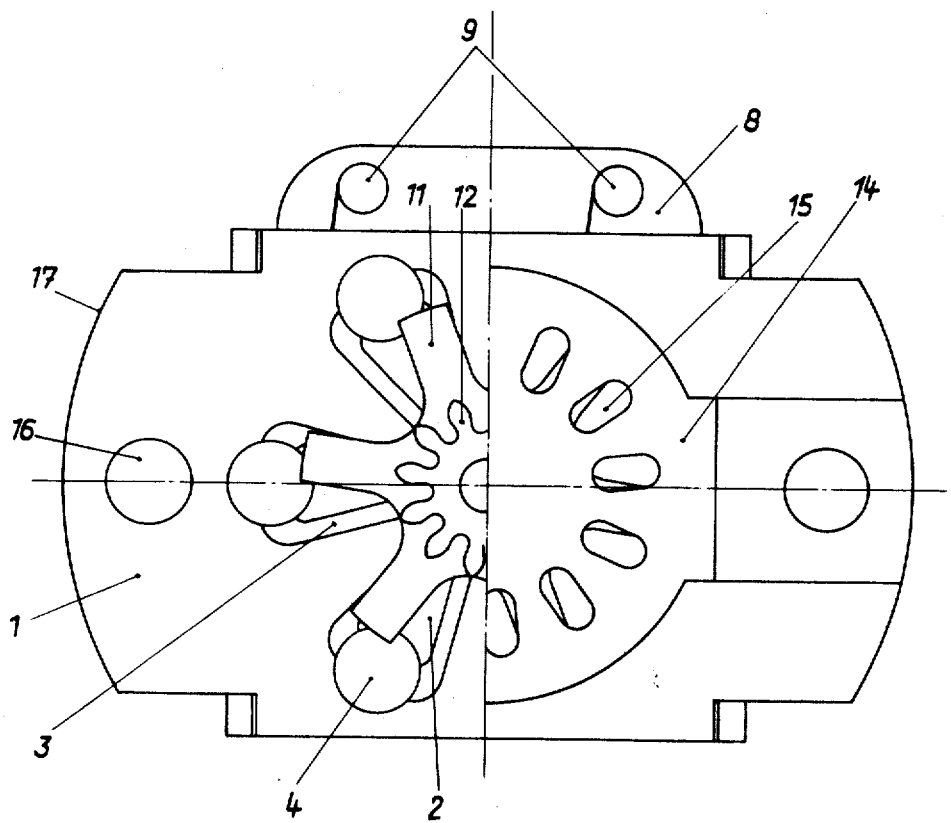
FIG. 2 is a partly cut-away plan view of the motor.
Figure 4:
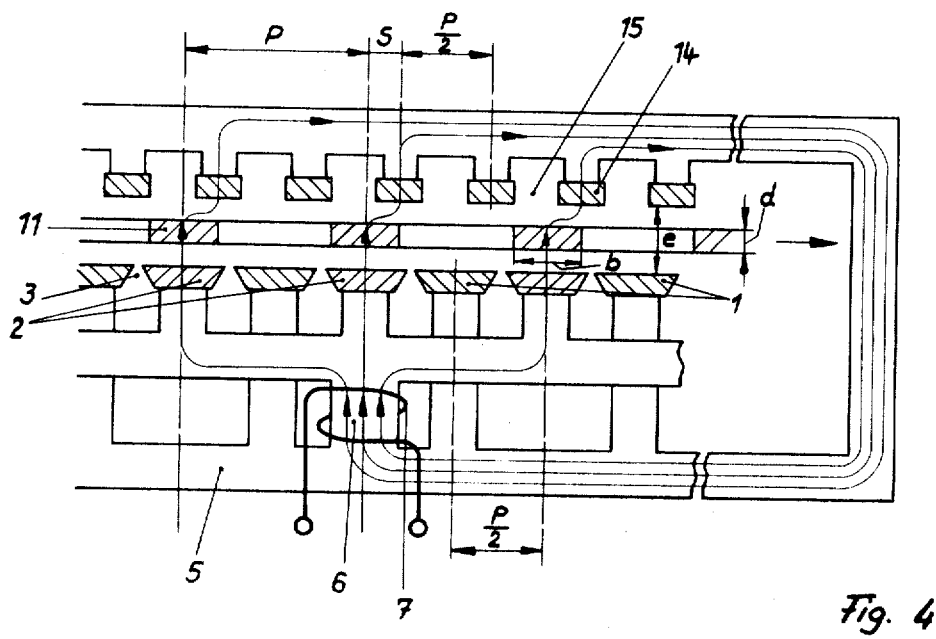
FIG.4 is a linear diagram illustrating the principle of operation of the motor.

The principle of the electromechanical coupling in the motor is illustrated in FIG. 4, which is a linear diagram of the motor of FIGS. 1 and 2. Corresponding parts are indicated by the same reference numerals in the three figures. In this linear configuration the adjacent teeth of each part of the stator, and of the rotor, are separated by a distance or pitch $p$, while the distance from the middle of one pole or tooth of part 1 to the middle of the adjacent pole or tooth of part 2 is $p/2$. The same distance, $p/2$, separates adjacent slots 15 of cover 14 (i.e., about an opening 15), and corresponds to the distance covered by the rotor for each pulse or step.

On FIG. 4, the rotor disc 11 is positioned so that its teeth face the teeth of the inner part 2 of the stator. This position corresponds to the maximum flux $\phi_{max}$ induced in the core 6 of coil 7. If the rotor moves by $p/4$, the flux is reduced by half. If the rotor moves by $p/2$ from the initial position shown, the teeth of rotor disc 11 come to face the teeth of the outer part 1 of the stator, and the flux "closes up" almost completely by-passing core 6, i.e., the flux in the core 6 takes its minimum value $\phi_{min} \cong 0$. An electromechanical coupling factor $\alpha$ can be defined as the ratio of the electrically originating torque $C_e$ to the current $i$, which is equivalent to the ratio of the induced voltage $U_i$ to the angular speed $\Omega$, i.e.:

$$\alpha = C_e / i = U_i / \Omega \quad (1)$$

If the variation of the flux with the angle of displacement $\theta$ is approximately sinusoidal, the coupling factor is also a sinusoidal function of the angle $\theta$, with a maximum amplitude $$\alpha_{max} = U_{imax} / \Omega$$
$$= N (d\phi/dt)_{max} \cdot (d\theta/dt)$$
$$= N (d\phi/d\theta)_{max}$$
$$\alpha_{max} \cong 0.5 \, nN\phi_{max} \quad (2)$$

where $N$ is the number of turns of coil 7, and $n$ the number of teeth of the rotor. The distance, pitch or step $p$ of FIG. 4 is related to the number of teeth n and the mean radius $r$ of the rotor by $$p = 2 \pi r / n \quad (3)$$

It is advantageous, in order to enhance the efficiency of the motor, to provide a high coupling factor per turn, associated with a rotor of low moment of inertia. Without going into detailled calculations, it can be stated that this principle of coupling is very favorable from this point of view. Expression (2) shows that $\alpha_{max}$ increases with the number of teeth $n$, since $\phi_{max}$ is constant when $n$ is a low number. However, if the number of teeth $n$ is high, the lateral flux of the teeth becomes great and reduces $\phi_{max}$. The flux $\phi_{max}$ is given by $$\phi_{max} = k \, n \, \mu_o \, M \, b \cdot l \cdot d / e$$
$$\phi_{max} = k \, \mu_o \, M \, V_d / e \quad (4)$$

where $\mu_o M$ is the magnetization or intrinsic induction of the teeth of the rotor, $b$, $d$ and $e$ are dimensions as indicated in FIG. 4, $l$ is the length of the teeth perpendicular to FIG. 4, $k$ is a numerical factor depending on the distribution of the lines of flux in the air, thus of geometrical ratios. The second formula shows the effect of the total or effective volume $V_d$ of the teeth.

Corresponding values for the given motor are:
$b = 0.6$ mm; $l = 1$ mm; $d = 0.2$ mm; $e = 1$ mm; $n = 6$;
$V_d = 0.72$ mm$^3$; $\mu_o M = 0.45$ Vs/m$^2$; $k = 1.1$
$\phi_{max} = 0.37$ $\mu$Vs; $\alpha_{max} = 4.7 \times 10^{-3}$ Vs/rad FIG. 4 also shows the arrangement of the full parts and the openings 15 of cover 14 which produces the stable positions of the rotor. These stable positions correspond approximately to positions in which the teeth of the rotor are centered on full parts of cover 14. It can be seen on FIG. 4 that these full parts are staggered by an amount S in relation to the teeth of the stator. A staggering of $S = p/4$ would give a position coincinding with the maximum coupling factor; but this is not recommended, since the rotor could turn in either direction. A staggering S comprised between $p/12$ and $p/6$ gives a preferred direction of rotation to the motor. The geometrical proportions of cover 14 are chosen in a manner to give the desired magnetostatic torque $C_m$.

Figure 5:
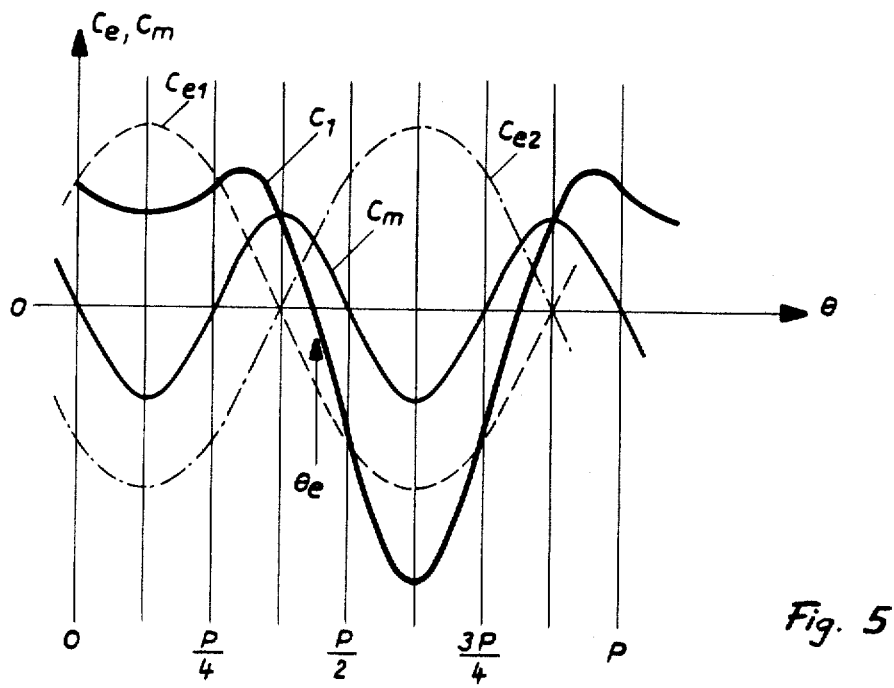
FIG. 5 is a graph showing the torque on the rotor during operation.

FIG. 5 is a graph showing, as a function of the angle $\theta$, the various torques acting on the rotor. The magnetically originating torque $C_m$ is an approximately sinusoidal function of the angle $\theta$, with a period $p/2$. The stable positions of the rotor, in the absence of an output torque, are given by the passages of $C_m$ through zero where the derivative is negative. One of these passages through zero is taken as the origin of angle $\theta$, i.e. as $\theta = 0$. The electrically originating torque $C_e$, produced by current in coil 7, is also a periodic, approximately sinusoidal function of angle $\theta$, but of period $p$, and whose phase is determined by the position of the teeth of the stator relative to the openings 15 of cover 14. On FIG. 5 is shown a special case for which the passages through zero of $C_{el}$ correspond to the maximas of $C_m$, and the amplitude of $C_{el}$ is double that of $C_m$. A first positive current pulse creates a torque $C_{el}$ on the rotor disc 11. The superimposition of torques $C_{el}$ and $C_m$ gives the resultant function or torque $C_l$ which remains as long as current is applied. If, starting from the stable position of the rotor disc 11 at $\theta = 0$ a current is applied, the resulting torque $C_l$ is positive and drives the rotor. If the supply of current is continued, this torque $C_l$ would remain positive up to the angle $\theta = \theta_e$ at which it is cancelled. However, it is not recommended to maintain the current for such a long time, for energy consumption reasons. The pulse duration is chosen so that the rotor arrives with certitude at a new stable position. This will in any case be possible if the current is cut when $\theta = p/4$ since from $\theta = p/4$ to $\theta = p/2$ the torque $C_m$ will drive the rotor.

In dynamic operation, it is possible to employ the kinetic energy of the rotor to make it pass by the region where $C_m$ is negative, which enables the duration of the applied current pulse to be further shortened. However, this kinetic energy of the rotor tends to make the rotor pass by its new equilibrium position. To prevent the rotor from advancing by more than one step, and/or from oscillating for a prolonged time about its new stable position, the following means can be employed: damping by magnetic losses or eddy currents in the stator; application of a short braking pulse while the rotor is positioned between $\theta = \theta_e$ and $\theta = p/2$; provision of a mechanism (e.g., a pawl) preventing reversal of the rotor.

If the following pulse is of opposite polarity to the first, the electrically originating torque will vary as a function of angle $\theta$ as shown by curve $C_{e2}$ (i.e., the same as $C_{e1}$, but dephased by $p/2$). The superimposition of this torque with the magnetostatic torque $C_m$ gives a curve (not shown) which has the same shape as $C_l$, but is dephased by an angle corresponding to $p/2$. The rotor will thus be submitted to the same conditions, and will once more advance by a step corresponding to $p/2$.

To verify the unidirectionality of the motor, we will consider the effect of application of a second pulse having the same polarity as the first. Once more, the resulting torque corresponds to $C_1$ but in this case, the rotor has an initial position corresponding to the angle $\theta = p/2$. The rotor is therefore subjected to a reversing torque, but this torque falls rapidly as soon as the rotor turns backwards, and is zero for an angle $\theta_e$ quite close to the initial position. Therefore, even if the current is applied for a fairly long period, the rotor will not turn backwards through a large angle, and will return to the same stable position after cutting of the current.

To sum up, the relative position and the amplitudes of the magnetostatic and electrical torques give the motor the following characteristics:

1. Correct operation by the application of pulses of alternating polarity, i.e., bipolar pulses.
2. Unidirectional movement (reverse movement excluded).
3. If the rotor has an incorrect starting position, it remains still during the first pulse, then advances correctly, starting with the second pulse.

Figure 6:
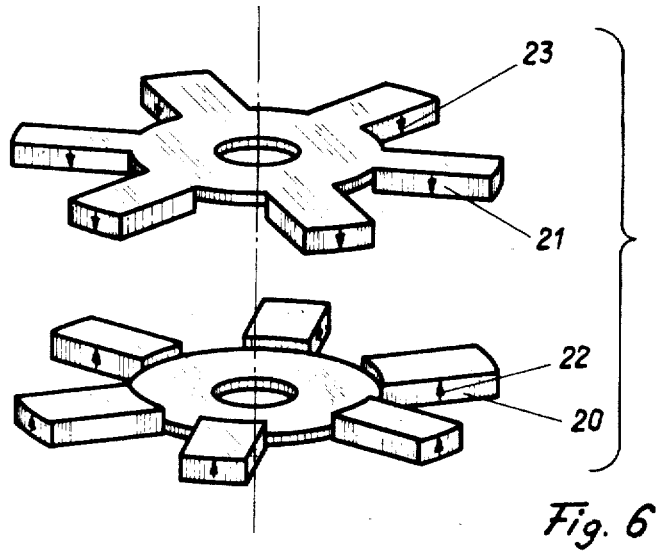
FIG. 6 is an exploded perspective view of a modified form of the rotor.

FIG. 6 shows a modified form of rotor consisting of two toothed discs 20 and 21. Each of these discs has the same number of teeth (six) as the rotor of FIG. 2 and is homogeneously magnetized in the axial direction. These discs have teeth of the same thickness as those of FIG. 1, and a central part of reduced thickness. Two of these discs can be assembled, by turning over one relative to the other, and imbricating their teeth into one another so that the directions of magnetization 22 and 23 are mutually opposite. In this manner, a composite rotor with alterning poles is obtained. The coupling factor is doubled, and the output is improved compared to the motor with a single rotor shown in FIGS. 1 and 2. This improvement is evidently only obtained at the cost of supplementary manufacturing operations.

What is claimed is:

1. Electromagnetic stepping micromotor for timepieces comprising a rotor in the form of at least one disc having magnetized parts and a stator of soft ferromagnetic material having two parts presenting a coplanar surface towards the rotor, the parts being separated from each other by a sinuous air-gap, wherein the rotor is flat and includes at least one wheel having a plurality of teeth equidistant from each other, said teeth being axially magnetized in the same direction, the air-gap of the stator being narrow in relation to the width of the teeth of the rotor and presenting a number of radial segments equiangularly equidistant from each other and equal to twice the number of rotor teeth.

2. Micromotor according to claim 1, comprising means for defining a number of angularly stable positions of the rotor equal to twice the number of rotor teeth.

3. Micromotor according to claim 2, in which said means comprises an auxiliary plate of soft ferromagnetic material fixed to the stator parallel to the plane of said coplanar parts of the stator, said plate being provided with periodic variations of reluctance corresponding to said number of stable positions.

4. Micromotor according to claim 1, in which said two coplanar parts of the stator are held together in the same plane by non-magnetic joining elements.

5. Micromotor according to claim 1, in which the stator exerts on the rotor an axial force greater than the weight of the rotor, and in which the rotor is pivotally mounted about a pin fixed to said stator, said pin including means for limiting the axial position of the rotor.

6. Micromotor according to claim 5, in which the stator includes at its outer periphery arcuate edges defining means for centering the stator, said arcuate edges being coaxial with said pin.

7. Micromotor according to claim 1, in which the rotor comprises first and second toothed wheels the teeth of which are imbricated in one another, the teeth of the first and second wheels being axially magnetized in opposite directions.

* * * * *